(12) United States Patent
Momoki et al.

(10) Patent No.: US 8,279,526 B2
(45) Date of Patent: Oct. 2, 2012

(54) OPTICAL SYSTEM AND IMAGE PICKUP APPARATUS HAVING SAME

(75) Inventors: Kazuhiko Momoki, Koshigaya (JP); Sayoko Amano, Utsunomiya (JP); Takehiko Nakai, Utsunomiya (JP); Reona Ushigome, Utsunomiya (JP); Takeharu Okuno, Utsunomiya (JP); Daisuke Sano, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 860 days.

(21) Appl. No.: 12/195,195

(22) Filed: Aug. 20, 2008

(65) Prior Publication Data

US 2009/0067053 A1    Mar. 12, 2009

(30) Foreign Application Priority Data

Sep. 12, 2007    (JP) .................................. 2007-236408

(51) Int. Cl.
*G02B 5/02*    (2006.01)

(52) U.S. Cl. ...................................................... 359/599

(58) Field of Classification Search .................... 359/599
See application file for complete search history.

(56) References Cited

U.S. PATENT DOCUMENTS

| 6,114,485 A * | 9/2000 | Kobayashi et al. ........... 526/289 |
| 2006/0158972 A1* | 7/2006 | Kimura ........................ 369/44.23 |
| 2006/0199040 A1* | 9/2006 | Yamada et al. ............... 428/701 |

FOREIGN PATENT DOCUMENTS

| JP | 2005-157119 A | 6/2005 |
| JP | 2006-010831 A | 1/2006 |
| JP | 2006-201371 A | 8/2006 |
| JP | 2006-259711 A | 9/2006 |
| JP | 2007-039604 A | 2/2007 |

* cited by examiner

*Primary Examiner* — Lee Fineman
(74) *Attorney, Agent, or Firm* — Canon USA Inc. IP Division (57) ABSTRACT

An optical system includes an optical element formed of resin. On at least one of optical surfaces on the light incidence side of the optical element formed of resin, a plurality of depressions or protrusions of a size not larger than the wavelengths of visible light is formed without a periodic structure or in a random arrangement.

5 Claims, 10 Drawing Sheets

FIG. 15
SCATTERING RATE [%]

FIG. 16
REFLECTANCE [%]

OPTICAL SYSTEM AND IMAGE PICKUP APPARATUS HAVING SAME

BACKGROUND OF THE INVENTION

1. Field of the Invention

The present invention relates to an optical system and an image pickup apparatus having the same, and is suitable for, for example, silver-halide film cameras, digital still cameras, and video cameras.

2. Description of the Related Art

Many lenses, filters, and so forth formed of resin such as acrylic resin or polycarbonate resin are used in optical systems used in recent image pickup apparatuses such as digital cameras and video cameras.

Optical elements formed of resin are characterized by high moldability and high shape freedom. In addition, adhesion using thermoplasticity, ultraviolet curability, and so forth of resin is possible. It is also possible to transfer a fine structure onto the surface of an optical element. Therefore, optical elements formed of resin are widely used in optical systems, as plastic mold lenses, adhesive layers bonding surfaces together, diffractive optical elements, focusing plates, microlenses for image sensors, color filters, and so forth.

Optical surfaces of optical elements are often provided with an antireflection structure. However, it is technically difficult to deposit a dielectric antireflection coating onto an optical surface of an optical element formed of resin. Therefore, instead of depositing a dielectric antireflection multilayer coating onto an optical surface of an optical element formed of resin, there is proposed to form a fine textured periodic structure (depressions or protrusions) shorter than the wavelengths of visible light to obtain an antireflection effect. Japanese Patent Laid-Open No. 2005-157119 discloses an optical element having a fine textured periodic structure formed on an optical surface thereof. Japanese Patent Laid-Open No. 2006-10831 discloses an antireflection structure in which fine protrusions or depressions are staggered.

Resin is a macromolecule made of carbon atoms bonded together. Incidence of short-wavelength light breaks the bond in the macromolecule and causes physical and chemical changes. The bond energy and the wavelength of light corresponding to the bond energy are fixed. For example, the bond energy of C—C bonds is 346 kJ/mol, and the wavelength $\lambda$ of light corresponding thereto is 347.2 nm. The bond energy of C=C bonds is 340 kJ/mol, and the wavelength $\lambda$ of light corresponding thereto is 353.3 nm. The bond energy of C—O bonds is 386 kJ/mol, and the wavelength $\lambda$ of light corresponding thereto is 311.2 nm. The bond energy of C=O bonds is 374 kJ/mol, and the wavelength $\lambda$ of light corresponding thereto is 321.2 nm. Elemental sulfur S is used to increase the refractive index of resin. Since the bond energy of C—S bonds is low (269 kJ/mol), C—S bonds are easily broken, and resin can become yellow due to the effects of elemental sulfur S.

As described above, braking of these bonds by short-wavelength light (ultraviolet light of 300 nm to 400 nm) is one of the causes of deterioration in optical performance when optical elements formed of resin are used.

In general, lens materials have high absorption coefficients for ultraviolet light. Reflection-reducing multilayer coatings for visible light have low transmittances for ultraviolet light. Therefore, commonly used optical systems have low transmittances for ultraviolet light. Therefore, optical members formed of resin disposed on the image side of an optical system are irradiated with a relatively small quantity of ultraviolet light. Therefore, the effects of incidence of ultraviolet light on the optical elements formed of resin should not be significant. However, if converging ultraviolet light falls on the optical elements formed of resin, the effects of the ultraviolet light is not negligible.

Antireflection multilayer coatings used in lens systems have high antireflection properties for visible light but function as reflectance-increasing coatings for ultraviolet light.

Figure 13:
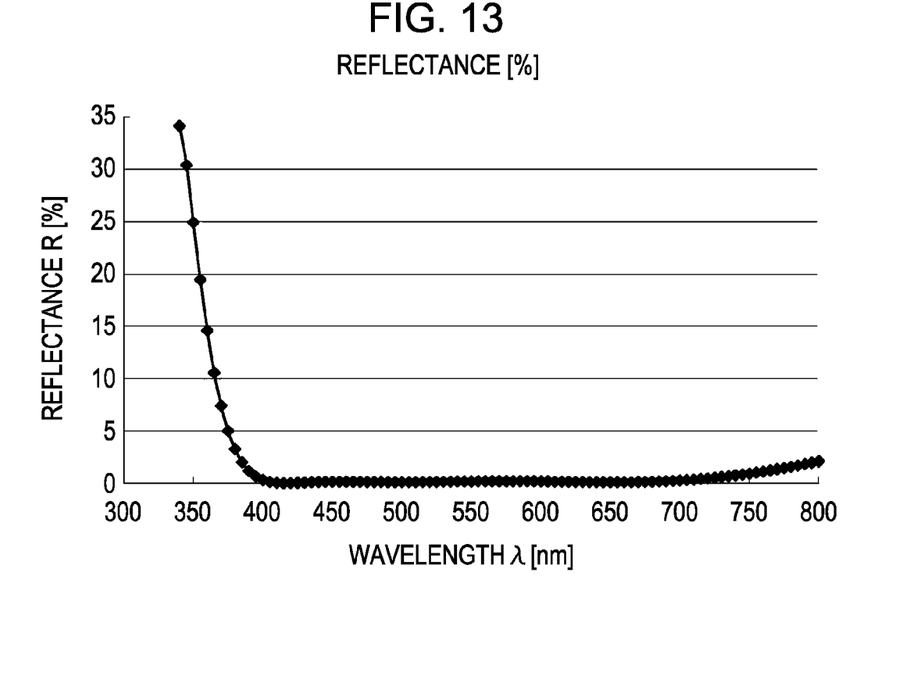
FIG. 13 is a graph showing the spectral reflectance property of a dielectric multilayer coating.

FIG. 13 illustrates the spectral property of a commonly used antireflection coating. Commonly used antireflection multilayer coatings have increased reflectances in the wavelength regions of ultraviolet light and infrared light when they are optimized so as to have reduced reflectances throughout the visible light range. Antireflection multilayer coatings are made by layering a dielectric layer having a low refractive index (L-layer) and a dielectric layer having a high refractive index (H-layer). The layers have a thickness such that the light path length is about quarter of the wavelength. Reflections undergo destructive interference. However, in the cases of ultraviolet light and infrared light, reflections undergo constructive interference.

Figure 7:
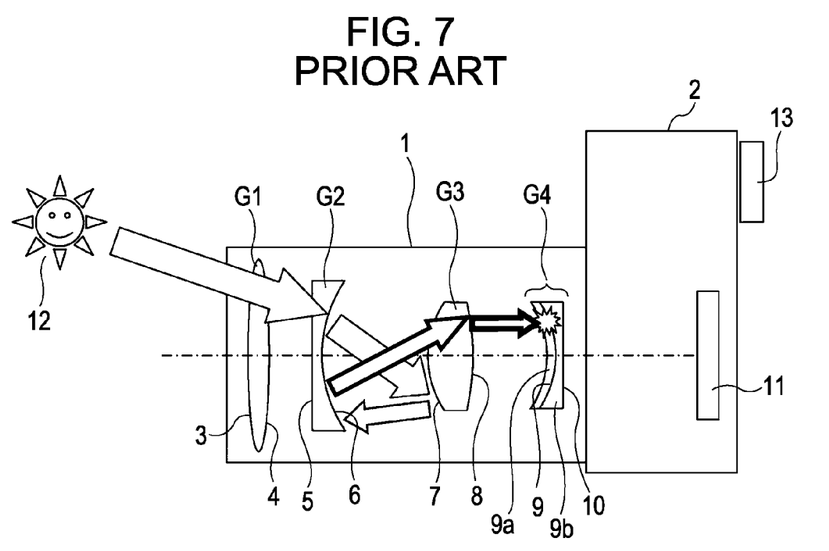
FIG. 7 illustrates a ghost image in a conventional optical system.
Figure 8:
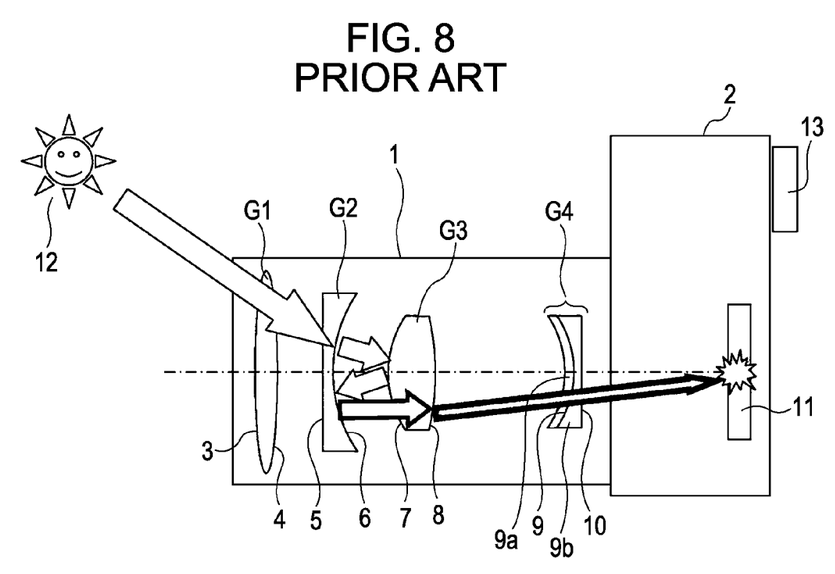
FIG. 8 illustrates a ghost image in a conventional optical system.

FIGS. 7 and 8 are schematic sectional views of an image pickup apparatus and an optical system commonly used therein.

Reference numeral 1 denotes an interchangeable lens (photographing optical system). Reference numeral 2 denotes a single-lens reflex camera, to which the photographing optical system 1 is detachably attached. Reference letter Gi denotes the ith lens constituting the photographing optical system 1 counting from the object side (light incidence side). Reference numerals 3 and 4 denote the object side and image side optical surfaces, respectively, of the first lens G1. Reference numerals 5 and 6 denote the object side and image side optical surfaces, respectively, of the second lens G2. Reference numerals 7 and 8 denote the object side and image side optical surfaces, respectively, of the third lens G3.

The fourth lens G4 is a compound aspheric lens. On the object side optical surface 9, an aspheric layer 9a is formed by molding of plastic resin. A lens element 9b having optical surfaces 9 and 10 is formed of a normal glass lens material. The optical surfaces 9 and 10 are spherical surfaces. Reference numeral 11 denotes an image pickup element disposed on the optical axis of the optical system 1 in the single-lens reflex camera 2. Reference numeral 12 denotes a light source. Reference numeral 13 denotes a finder.

In FIG. 7, ultraviolet light from an intense point light source 12 such as the sun passes through the optical surfaces 3 and 4 of the first lens G1 and then passes through the optical surfaces 5 and 6 of the second lens G2. The ultraviolet light can be reflected by the optical surface 7 of the third lens G3 and then by an antireflection multilayer coating on the optical surface 6 of the second lens G2. As a result, the ultraviolet light can fall on the optical element 9a formed of resin as a surface reflection ghost image.

As shown in FIG. 8, when some of the lens elements of the photographing optical system 1 are at certain positions due to zooming or focusing, ultraviolet light from the light source 12 outside the field of view can fall on the image pickup element 11 as a ghost image.

Since the art of Japanese Patent Laid-Open No. 2005-157119 uses a fine textured periodic structure, the reflectance for visible light can be reduced but many diffraction rays are generated for ultraviolet light.

Figure 9:
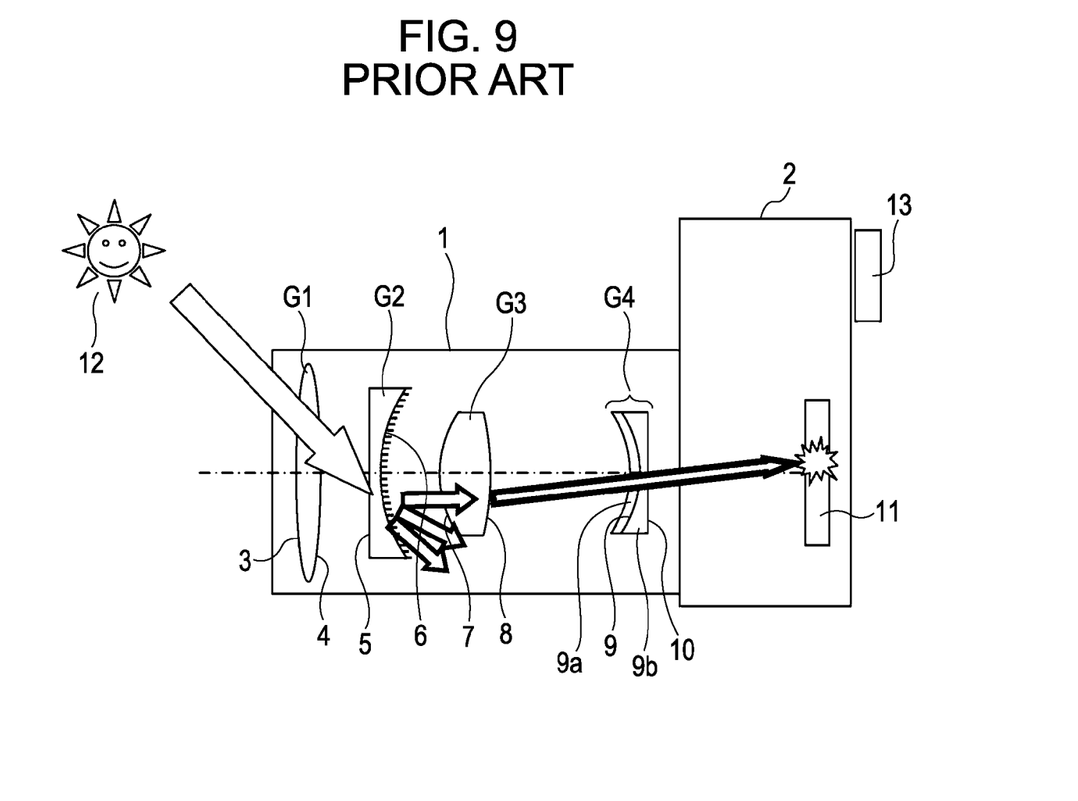
FIG. 9 illustrates a ghost image in a conventional optical system.

For example, as shown in FIG. 9, even if the light source 12 is outside the field of view, incident light is significantly diffracted by the fine textured periodic structure formed on the optical surface 6 and can reach the image pickup element 11 via the rear optical system.

In the art of Japanese Patent Laid-Open No. 2005-157119, the fine textured periodic structure is a two-dimensional square array on a surface of a lens. Therefore, diffraction rays tend to concentrate in the lattice direction.

Also in the antireflection element of Japanese Patent Laid-Open No. 2006-10831, as in the art of Japanese Patent Laid-Open No. 2005-157119, diffraction rays are generated by a periodic structure. The two-dimensional extent of diffraction rays is, unlike in the case of the square array, in oblique directions or six directions at intervals of 60 degrees. However, the number of rays into which a ray is split is the same. Therefore, the effect of dispersing the energy of a ray is insignificant. Therefore, also in this case, ultraviolet light is strongly diffracted in certain directions.

As described above, in the cases of the conventional antireflection structures, although the quantity of ultraviolet light with which an entire optical element formed of resin is irradiated is small, converging ultraviolet light can locally deteriorate the optical element.

SUMMARY OF THE INVENTION

The present invention can prevent ultraviolet light from converging on an optical element formed of resin, prevent deterioration in optical property of the optical element formed of resin, and achieve excellent optical performance.

In an aspect of the present invention, an optical system includes an optical element formed of resin. On at least one of optical surfaces on the light incidence side of the optical element formed of resin, a plurality of depressions or protrusions of a size not larger than the wavelengths of visible light is formed without a periodic structure or in a random arrangement.

Further features of the present invention will become apparent from the following description of exemplary embodiments with reference to the attached drawings.

DESCRIPTION OF THE EMBODIMENTS

An optical system of the present invention includes at least one optical element formed of resin. The optical element formed of resin is, for example, at least one of a plastic mold lens, an adhesive layer of a cemented lens, a color filter, and a polarizer.

On at least one of optical surfaces on the light incidence side of the optical elements formed of resin in the light path, a plurality of depressions or protrusions (textured structure) of a size not larger than the wavelengths of visible light is formed without a repeated structure or in a random arrangement.

The plurality of depressions or protrusions scatters ultraviolet light and prevents reflection of visible light.

Specifically, the operation of the plurality of depressions or protrusions is as follows. Let Sa denote a scattering rate at a wavelength $\lambda a$ of 360 nm. Let Sb denote a scattering rate at a wavelength $\lambda b$ of 550 nm. Let Rb denote a reflectance at a wavelength $\lambda b$ of 550 nm.

The following conditional expressions are satisfied:

$$Sa > 1\% \tag{1},$$

$$Sb < 1\% \tag{2, and}$$

$$Rb < 5\% \tag{3}.$$

When the plurality of depressions or protrusions is irradiated with an incident light beam, scattering rate S means the ratio of the intensity of all light beams diverging in the directions other than the incident direction to the intensity of the incident light beam.

Reflectance R is the ratio of the intensity of a reflected light beam to the intensity of an incident light beam incident on the plurality of depressions or protrusions.

Conditional expression (1) shows the lower limit of the scattering rate of ultraviolet light. When scattering rate Sa of light of wavelength 360 nm is smaller than the lower limit of Conditional expressions (1), it is difficult to effectively prevent ghost imaging of ultraviolet light.

Conditional expressions (2) and (3) show transmission performance for visible light of wavelength 550 nm. When scattering rate Sb exceeds the upper limit of Conditional expression (2), the effect of the scattering of visible light on the image is significant.

When reflectance Rb exceeds the upper limit of Conditional expression (3), that is, when the reflectance of the plurality of depressions or protrusions is high, it is difficult to effectively reduce ghost images of visible light.

The plurality of depressions or protrusions formed on the optical surface of this embodiment has a high visible light transmittance and reduces ghost images due to surface reflection of ultraviolet light.

Particularly in the case of light from an intense point light source such as sunlight, it is possible to reduce ghost images due to surface reflection and prevent collection of light rays regardless of the incidence angle of light rays and the state of zooming or focusing of optical members. As a result, deterioration of the optical element formed of resin in the optical system can be minimized. The present invention is effective particularly when the resin is a material having C—S bonds.

Embodiments of the present invention will now be described with reference to the drawings.

First Exemplary Embodiment

Figure 1:
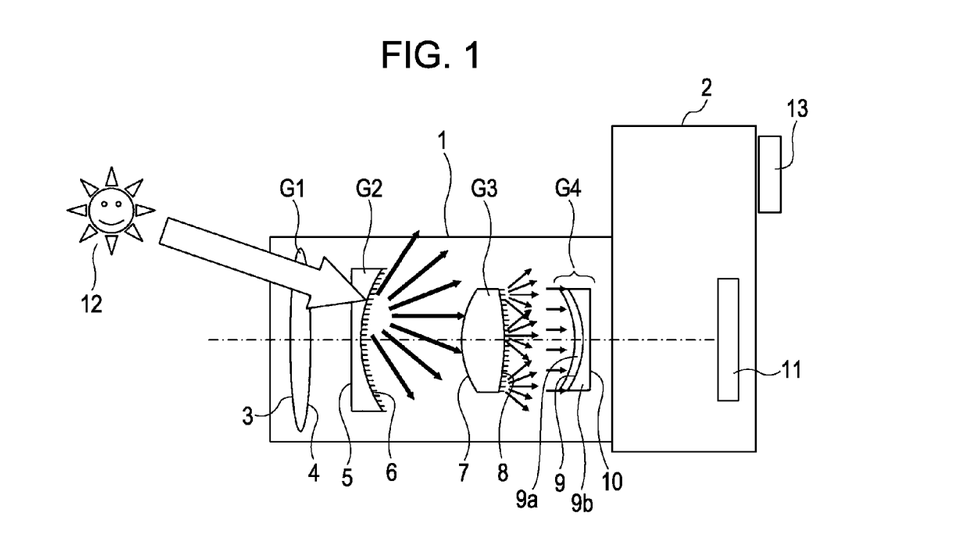
FIG. 1 is a schematic view of an example optical system according to a first exemplary embodiment of the present invention.
Figure 2:
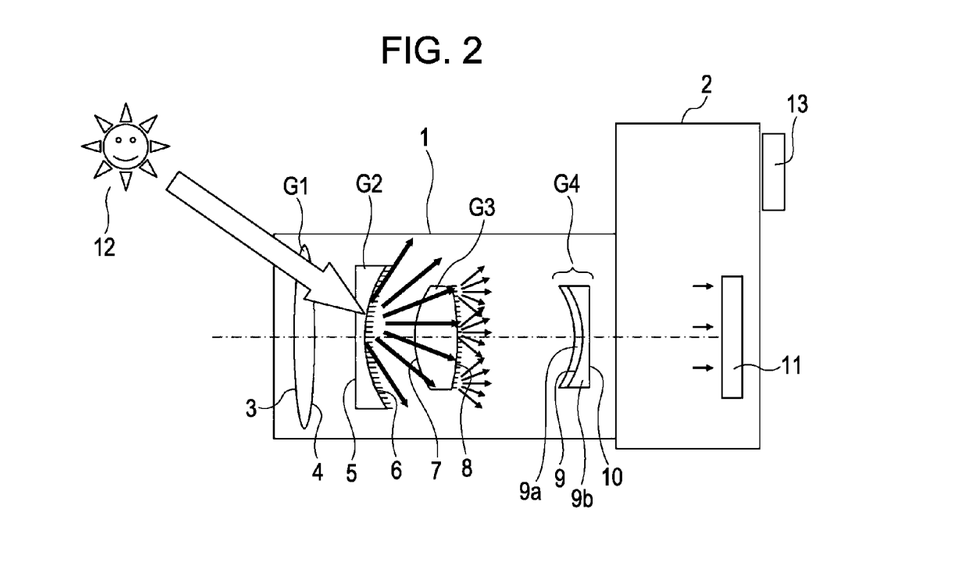
FIG. 2 is a schematic view of the optical system of FIG. 1 in another state.

FIG. 1 is a schematic view of an optical system according to a first embodiment of the present invention. FIG. 2 shows the optical system 1 of FIG. 1 with some lenses moved for focusing or zooming in the direction of the optical axis.

Reference numeral 1 denotes a photographing optical system. Reference numeral 2 denotes a single-lens reflex camera, to which the photographing optical system 1 is detachably attached.

Reference letter Gi denotes the ith lens constituting the photographing optical system 1 counting from the object side (light incidence side).

The photographing optical system 1 of this embodiment includes four lenses: a first lens G1, a second lens G2, a third lens G3, and a fourth lens G4. However, the number of lenses constituting an optical system of the present invention is not limited to four.

Reference numerals 3 and 4 denote the object side and image side optical surfaces, respectively, of the first lens G1. Reference numerals 5 and 6 denote the object side and image side optical surfaces, respectively, of the second lens G2. Reference numerals 7 and 8 denote the object side and image side optical surfaces, respectively, of the third lens G3.

The fourth lens G4 is a compound aspheric lens. On the object side optical surface 9, an aspheric layer (optical element) 9a is formed by molding of plastic resin.

The object side surface of the optical element 9a is aspherical. A lens element 9b having optical surfaces 9 and 10 is formed of a normal glass lens material. The optical surfaces 9 and 10 are spherical surfaces. Reference numeral 11 denotes an image pickup element for detecting an image, which is disposed on the optical axis of the optical system 1. Reference numeral 12 denotes a light source. Reference numeral 13 denotes a finder.

In this embodiment, on each of two optical surfaces 6 and 8 constituting the optical system 1 is formed a plurality of depressions or protrusions not larger than the wavelengths of visible light (wavelengths 400 nm to 700 nm).

In this embodiment, the optical surfaces 6 and 8 on each of which a plurality of depressions or protrusions are formed are located on the image side of the optical surface 4 (the second optical surface counting from the light incident side). On the optical surface 3 (the first optical surface counting from the light incident side) is formed a thin antireflection coating.

In FIG. 1, rays from the light source 12 pass through the optical surfaces 3, 4, and 5 and then fall on the optical surface 6. On the optical surface 6 is formed a fine textured structure.

Figure 11:
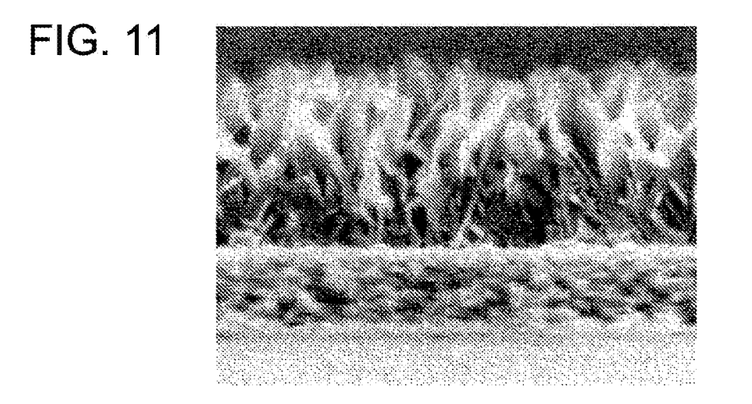
FIG. 11 is an SEM photograph of a cross section of a fine textured structure not larger than the wavelengths of visible light.
Figure 12:
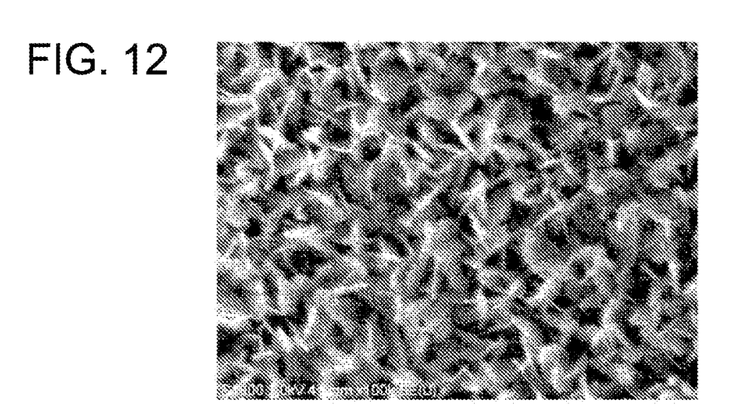
FIG. 12 is an SEM photograph of the upper surface of the fine textured structure of FIG. 11.

FIG. 11 is an SEM (scanning electron microscope) photograph of a cross section of the fine textured structure. FIG. 12 is an SEM photograph of the upper surface of the fine textured structure. This fine textured structure is petal-shaped crystal deposition. The density of the structure is highest in the vicinity of the interface between the structure and the substrate and decreases away from the interface.

Figure 6:
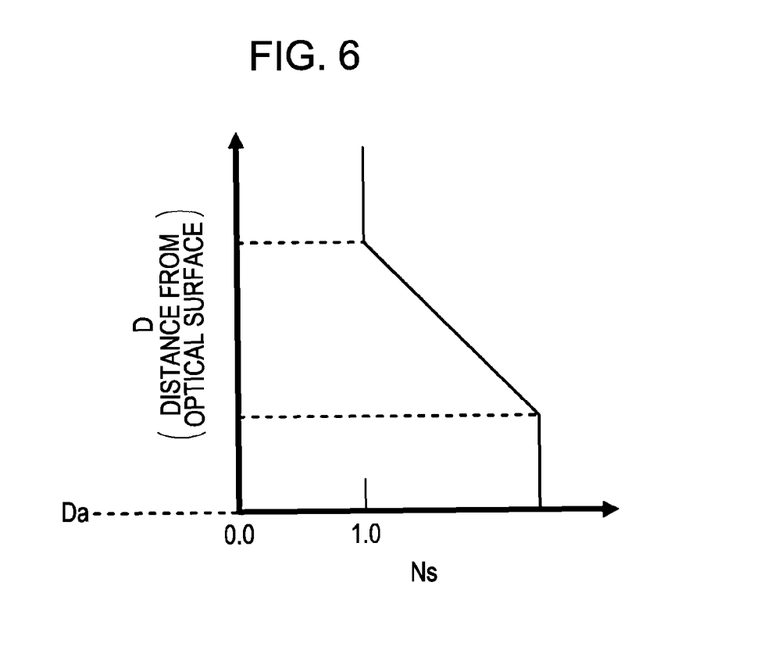
FIG. 6 is a schematic view showing the refractive index in the cross-sectional direction of a fine textured structure not larger than the wavelengths of visible light.

Since this fine textured structure is sufficiently fine with respect to visible light, it can be regarded as a thin film of equivalent refractive index (effective refractive index). FIG. 6 illustrates the effective refractive index of the cross section of FIG. 11.

In FIG. 6, the horizontal axis shows effective refractive index Ns. The vertical axis shows distance D from the optical surface. In the vicinity Da of the optical surface 6, the density of medium is high, and therefore the effective refractive index Ns is also high. The effective refractive index Ns decreases as the distance from the interface increases. At the upper end of the structure, the effective refractive index Ns is substantially the same as the refractive index of air (1). Therefore, with respect to visible light (wavelengths 400 nm to 700 nm), an excellent antireflection effect can be obtained as shown in the graph of spectral reflectance of FIG. 14.

Figure 15:
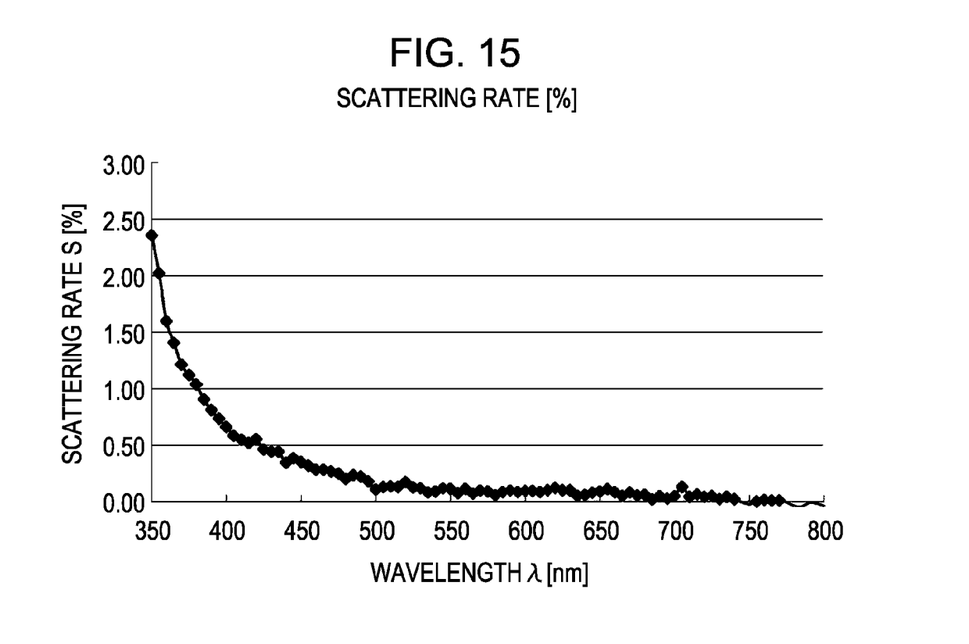
FIG. 15 is a graph showing the spectral scattering rate property of a fine textured structure not larger than the wavelengths of visible light.
Figure 16:
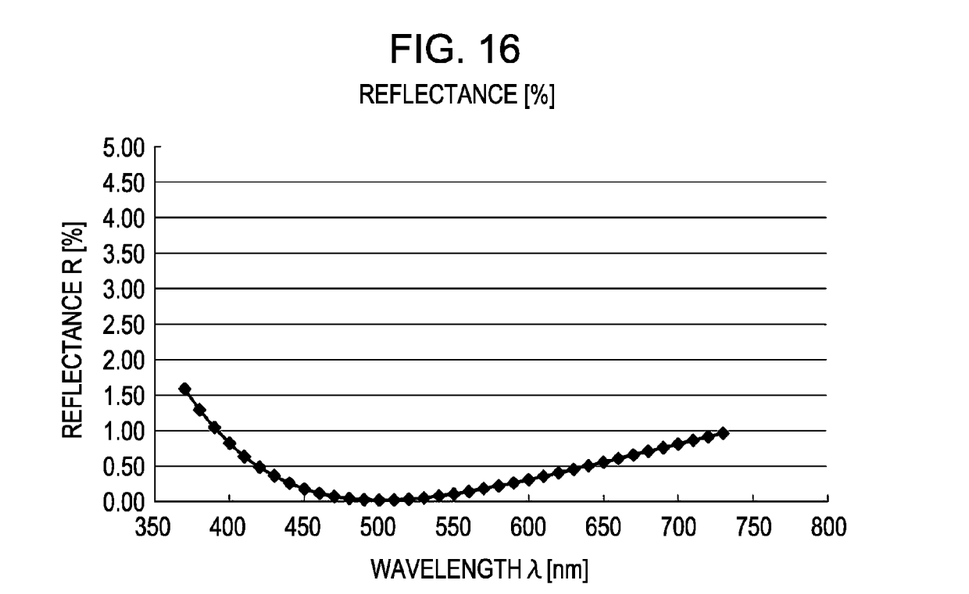
FIG. 16 is a graph showing the spectral reflectance property of a fine textured structure not larger than the wavelengths of visible light.
Figure 17:
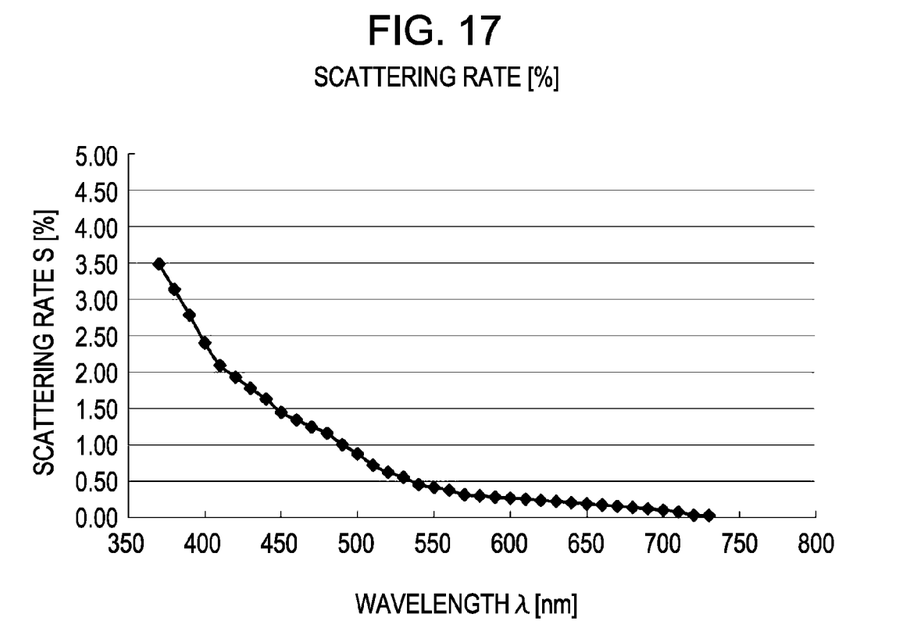
FIG. 17 is a graph showing the spectral scattering rate property of a fine textured structure not larger than the wavelengths of visible light.

On the other hand, with respect to ultraviolet light (wavelengths less than 400 nm), the scattering rate is high as shown in the graph of spectral scattering rate of FIG. 15. However, since the intervals of the depressions or protrusions are irregular, scattering rays do not concentrate in certain directions. Therefore, ultraviolet light from the light source 12 passes through the optical surfaces 3, 4, and 5, is thereafter scattered by the optical surface 6, and diffuses in all directions (solid angle $4\pi$, all space). Much of the diffused light is absorbed by the inner wall of the lens barrel.

Some rays pass the optical surface 7 on the image side of the optical surface 6 and reach the optical surface 8. Since the optical surface 8 also has a fine textured structure shown in FIGS. 11 and 12, the optical surface 8 also causes scattering.

Therefore, in the optical system of FIG. 1, only a small number of scattering rays of ultraviolet light fall on the aspheric layer 9a formed of resin disposed on the optical surface 9, and rays of ultraviolet light do not converge thereon.

Also in the optical system of FIG. 2, only a small number of scattering rays of ultraviolet light fall on the image pickup element 11, and ultraviolet light does not converge on the image pickup element 11.

Figure 14:
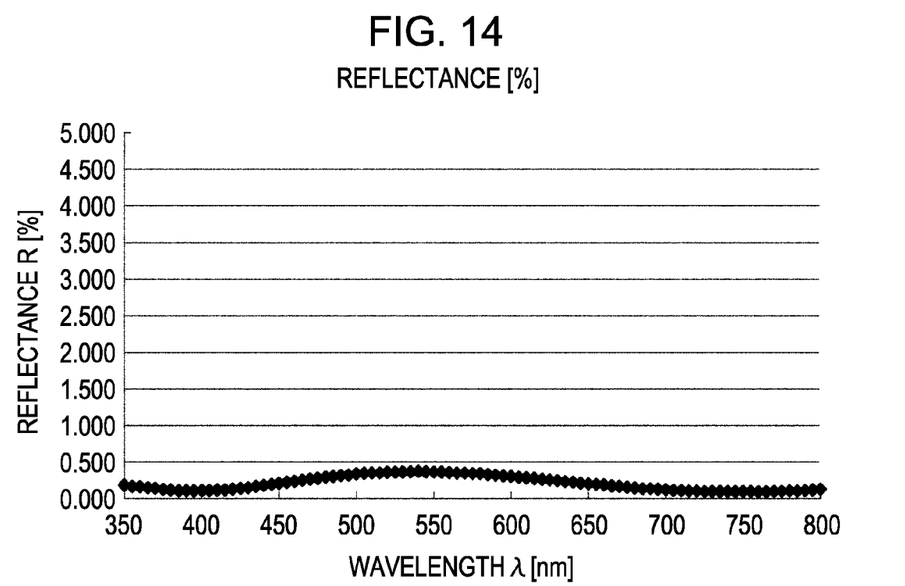
FIG. 14 is a graph showing the spectral reflectance property of a fine textured structure not larger than the wavelengths of visible light.

In the first embodiment, the scattering rates Sa and Sb and the reflectance Rb of the fine textured structure disposed on each of the optical surfaces 6 and 8 are as shown in FIGS. 14 and 15.

That is, Sa=1.5%, Sb=0.1%, and Rb=0.4%. These satisfy Conditional expressions (1), (2), and (3).

In this embodiment, the fine textured structure is formed on each of at least two of optical surfaces on the light incidence side (object side) of the optical element 9a formed of resin.

In this embodiment, let A2 denote the effective diameter of one of the two optical surfaces 6 and 8 closer to the optical element formed of resin 9a (optical surface 8).

Let D12 denote the distance between the two optical surfaces 6 and 8 in the direction of the optical axis. The following conditional expression is satisfied:

$$0 < A2/D12 < 2.0 \tag{4}$$

Figure 19:
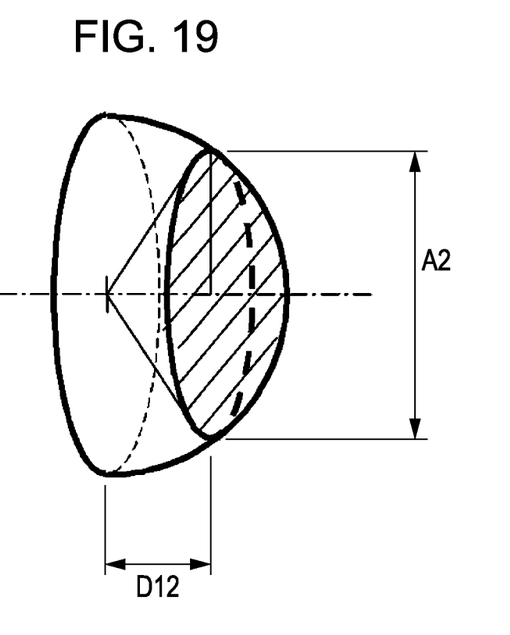
FIG. 19 illustrates Conditional expression (4).

FIG. 19 illustrates Conditional expression (4).

Conditional expression (4) defines the ratio between the distance between two optical surfaces scattering ultraviolet light and the effective diameter of the image side one of the two optical surfaces. In particular, Conditional expression (4) limits the proportion of ultraviolet rays reaching the second scattering surface (optical surface 8) to ultraviolet rays scattered by the first scattering surface (optical surface 6).

If rays incident parallel to the optical axis are perfectly scattered by the first scattering surface 6, they are evenly scattered in the directions of a hemisphere on the first scattering surface 6. The proportion of rays reaching the second scattering surface 8 is shown by the proportion of the solid angle of the second scattering surface 8 as viewed from the first scattering surface 6 to the solid angle of a hemisphere.

In the first embodiment of FIG. 1, the value of Conditional expression (4) is about $1/1.5$, and therefore Conditional expression (4) is satisfied. Also in the case of FIG. 2, the value of Conditional expression (4) is about 1, and therefore Conditional expression (4) is satisfied.

Second Exemplary Embodiment

Figure 3:
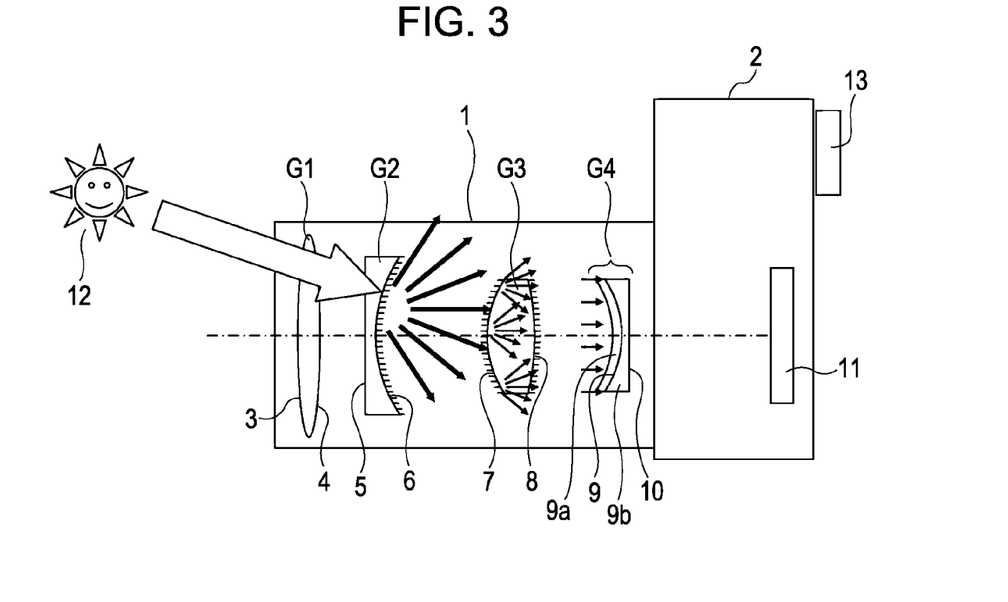
FIG. 3 is a schematic view of an example optical system according to a second exemplary embodiment of the present invention.

FIG. 3 is a schematic view of an optical system according to a second embodiment of the present invention.

Figure 4:
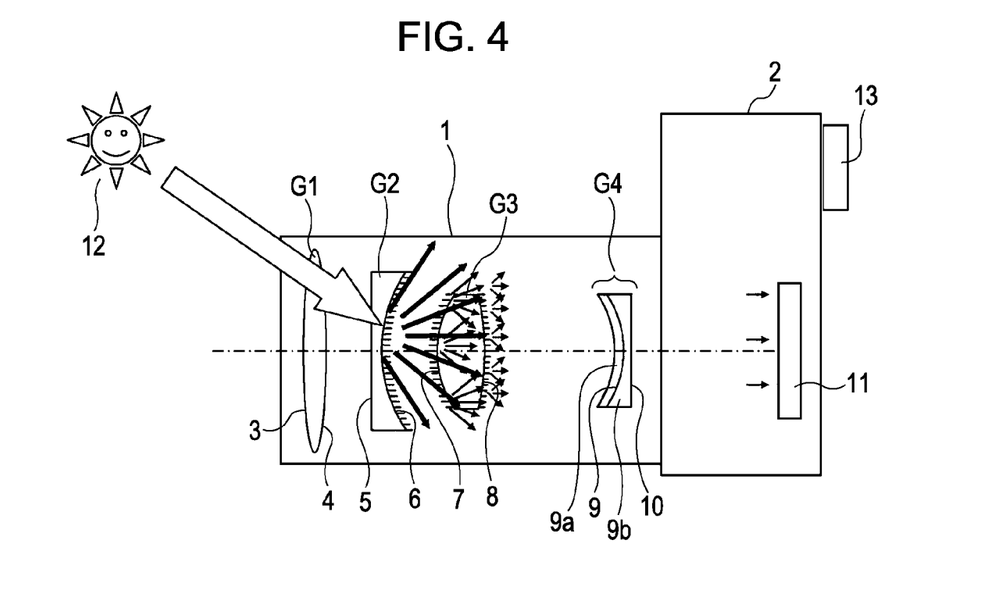
FIG. 4 is a schematic view of the optical system of FIG. 3 in another state.

FIG. 4 shows the optical system 1 of FIG. 3 with some lenses moved for focusing or zooming in the direction of the optical axis.

In FIGS. 3 and 4, the same reference numerals are used to designate the same components as those in FIG. 1.

In the second embodiment, a plurality of depressions or protrusions is formed on each of three of the optical surfaces on the light incidence side of an optical element 9a formed of resin.

In FIG. 3, as in FIG. 1, reference numeral 1 denotes a photographing lens. Reference numeral 2 denotes a single-lens reflex camera. In the photographing lens 1, reference numerals 3 and 4 denote optical surfaces of the first lens G1. Reference numerals 5 and 6 denote optical surfaces of the second lens G2. Reference numerals 7 and 8 denote optical surfaces of the third lens G3. The fourth lens G4 is a compound aspheric lens. On the incidence side of the fourth lens G4, an aspheric layer (optical element) 9a is formed by molding of plastic resin. The object side surface of the optical element 9a is aspherical. A lens element 9b having optical surfaces 9 and 10 is formed of a normal glass lens material. The optical surfaces 9 and 10 are spherical surfaces. Reference numeral 11 denotes an image pickup element disposed on the optical axis of the optical system 1.

In the second embodiment, on each of the optical surfaces 6, 7, and 8 is formed a plurality of depressions or protrusions not larger than the wavelengths of visible light.

In FIG. 3, rays from the light source 12 pass through the optical surfaces 3, 4, and 5 and reach the optical surface 6. As in the first embodiment, on the optical surface 6 is formed a plurality of depressions or protrusions (fine textured structure) shown in FIGS. 11 and 12.

As in the first embodiment, this fine textured structure is petal-shaped crystal deposition. The density of the structure is highest in the vicinity of the interface between the structure and the substrate and decreases away from the interface. Since this fine textured structure is sufficiently fine with respect to visible light, it can be regarded as a thin film of equivalent refractive index (effective refractive index). The effective refractive index of the cross section is as shown in FIG. 6.

In the vicinity of the optical surface, the density of medium is high, and therefore the effective refractive index is also high. The effective refractive index decreases as the distance from the interface increases. At the upper end of the structure, the effective refractive index is substantially the same as the refractive index of air. Therefore, with respect to visible light (wavelengths 400 nm to 700 nm), an excellent antireflection effect can be obtained as shown in the graph of spectral reflectance of FIG. 14.

On the other hand, with respect to ultraviolet light, as in the first embodiment, the scattering rate is high as shown in the graph of spectral scattering rate of FIG. 15. However, since the intervals of the depressions or protrusions are irregular, scattering rays do not concentrate in certain directions.

Therefore, ultraviolet light from the light source 12 passes through the optical surfaces 3, 4, and 5, is thereafter scattered by the optical surface 6, and diffuses in all directions. Much of the diffused light is absorbed by the inner wall of the lens barrel.

Some rays reach the optical surface 7. Since the optical surface 7 has the same fine textured structure as the optical surface 6, the optical surface 7 causes the same scattering. Some of the rays scattered by the optical surface 7 reach the optical surface 8. Since the optical surface 8 has the same fine textured structure as the optical surface 6, the optical surface 8 causes the same scattering.

Therefore, in the second embodiment of FIG. 3, only a small number of scattering rays of ultraviolet light fall on the aspheric layer 9a disposed on the optical surface 9, and rays of ultraviolet light do not converge thereon.

Also in the optical system of FIG. 4, only a small number of scattering rays of ultraviolet light fall on the image pickup element 11, and ultraviolet light does not converge thereon.

Therefore, the second embodiment has the same advantages as the first embodiment.

Third Exemplary Embodiment

Figure 5:
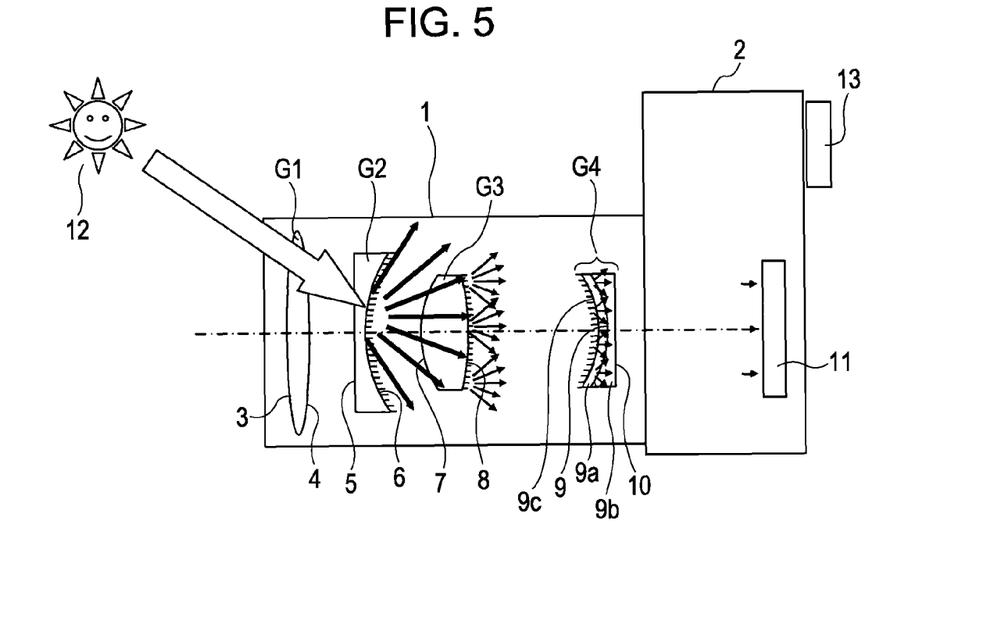
FIG. 5 is a schematic view of an example optical system according to a third exemplary embodiment of the present invention.

FIG. 5 is a schematic view of an optical system according to a third embodiment of the present invention.

In the third embodiment, a plurality of depressions or protrusions is formed on each of three of the optical surfaces on the light incidence side of an optical element 9a formed of resin.

In FIG. 5, the same reference numerals are used to designate the same components as those in FIG. 1.

In FIG. 5, as in FIG. 1, reference numeral 1 denotes a photographing lens. Reference numeral 2 denotes a single-lens reflex camera. In the photographing lens 1, reference numerals 3 and 4 denote optical surfaces of the first lens G1. Reference numerals 5 and 6 denote optical surfaces of the second lens G2. Reference numerals 7 and 8 denote optical surfaces of the third lens G3. The fourth lens G4 is a compound aspheric lens. On the incidence side of the fourth lens G4, an aspheric layer (optical element) 9a is formed by molding of plastic resin.

The object side surface of the optical element 9a is aspherical. A lens element 9b having optical surfaces 9 and 10 is formed of a normal glass lens material. The optical surfaces 9 and 10 are spherical surfaces. Reference numeral 11 denotes an image pickup element disposed on the optical axis of the optical system 1 in the single-lens reflex camera 2.

In the third embodiment, on each of the optical surfaces 6 and 8 and the light incidence side optical surface 9c of the optical element 9a is formed a plurality of depressions or protrusions not larger than the wavelengths of visible light.

In FIG. 5, rays from the light source 12 pass through the optical surfaces 3, 4, and 5 and reach the optical surface 6. As in the first embodiment, on the optical surface 6 is formed a fine textured structure shown in FIGS. 11 and 12.

As in the first embodiment, this fine textured structure is petal-shaped crystal deposition. The density of the structure is highest in the vicinity of the interface between the structure and the substrate and decreases away from the interface. Since this fine textured structure is sufficiently fine with respect to visible light, it can be regarded as a thin film of equivalent refractive index (effective refractive index). The effective refractive index of the cross section is as shown in FIG. 6.

In the vicinity of the optical surface, the density of medium is high, and therefore the effective refractive index is also high. The effective refractive index decreases as the distance from the interface increases. At the upper end of the structure, the effective refractive index is substantially the same as the refractive index of air. Therefore, with respect to visible light (wavelengths 400 nm to 700 nm), an excellent antireflection effect can be obtained as shown in the graph of spectral reflectance of FIG. 14.

On the other hand, with respect to ultraviolet light, as in the first embodiment, the scattering rate is high as shown in the graph of spectral scattering rate of FIG. 15. However, since the intervals of the depressions or protrusions are irregular, scattering rays do not concentrate in certain directions.

Therefore, ultraviolet light from the light source 12 passes through the optical surfaces 3, 4, and 5, is thereafter scattered by the optical surface 6, and diffuses in all directions. Much of the diffused light is absorbed by the inner wall of the lens barrel.

Some rays reach the optical surface 7. The rays passing through the optical surface 7 reach the optical surface 8. Since the optical surface 8 has the same fine textured structure as the optical surface 6, the optical surface 8 causes the same scattering. Some of the rays scattered by the optical surface 8 reach the optical surface 9c. The optical surface 9c has a fine textured structure shown in FIG. 10. Therefore, the optical surface 9c also causes scattering.

Figure 10:
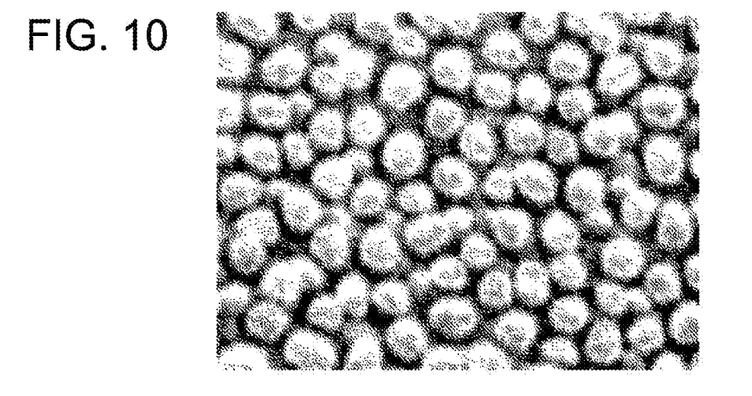
FIG. 10 is an SEM photograph of the upper surface of a fine textured structure not larger than the wavelengths of visible light.

FIG. 10 is an SEM photograph of the upper surface of the fine textured structure on the optical surface 9c. This fine textured structure is a plurality of depressions or protrusions arranged randomly. The density of the structure is highest in the vicinity of the interface between the structure and the substrate and decreases away from the interface. Since this fine textured structure is sufficiently fine with respect to visible light, it can be regarded as a thin film of equivalent refractive index (effective refractive index).

Figure 18:
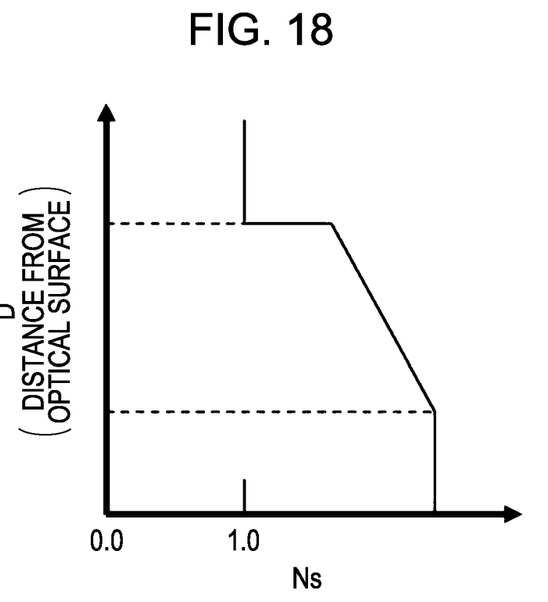
FIG. 18 is a schematic view showing the refractive index in the cross-sectional direction of a fine textured structure not larger than the wavelengths of visible light.

FIG. 18 illustrates the effective refractive index of the cross section of the structure of FIG. 10 similarly to FIG. 6. In the vicinity of the optical surface 9c, the density of medium is high, and therefore the effective refractive index Ns is also high.

The effective refractive index decreases as the distance from the interface increases. At the upper end of the structure, the effective refractive index Ns is lowest. Therefore, with respect to visible light (wavelengths 400 nm to 700 nm), an excellent antireflection effect can be obtained as shown in the graph of spectral reflectance of FIG. 14.

On the other hand, with respect to ultraviolet light, as in the first embodiment, the scattering rate is high as shown in the graph of spectral scattering rate of FIG. 15. However, since the intervals of the depressions or protrusions are irregular, scattering rays do not concentrate in certain directions.

Therefore, in FIG. 5, only a small number of scattering rays of ultraviolet light fall on the image pickup element 11, and ultraviolet light does not converge thereon.

Accordingly, the third embodiment has the same advantages as the first embodiment.

In each embodiment, the optical element formed of resin may be a microlens, a focusing plate, or a lens constituting a finder.

Each embodiment can reduce the effect of ultraviolet light on optical elements formed of resin such as a plastic mold lens, an adhesive layer for bonding surfaces, a diffractive optical element, a focusing plate, a microlens for an image sensor, and a color filter, in an optical system.

As a result, an optical system in which change in optical property due to deterioration of an optical element is small and which therefore has excellent optical property, and an image pickup apparatus having the same can be obtained.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-236408 filed Sep. 12, 2007, which is hereby incorporated by reference herein in its entirety.

What is claimed is:

1. A photographing optical system comprising:
 a plurality of lenses in an optical path, each lens having optical surfaces;
 an optical element formed of resin in the optical path; and
 a plurality of depressions or protrusions of a size not larger than wavelengths of visible light, and without having a periodic structure or being in a random arrangement, formed on at least two optical surfaces of the plurality of lenses which are located on a light incidence side of the optical element, the plurality of depressions or protrusions configured to scatter ultraviolet light and prevent reflection of visible light,
 wherein the following conditional expression is satisfied:
 $0<A2/D12<2.0$, in which A2 is an effective diameter of one of two optical surfaces closest to the optical element, and D12 is a distance between the two optical surfaces,
 wherein the plurality of depressions or protrusions satisfies the following conditional expressions:

$$Sa > 1\%,$$

$$Sb < 1\%, \text{ and}$$

$$Rb < 5\%,$$

wherein Sa is a scattering rate at a wavelength of 360 nm, Sb is a scattering rate at a wavelength of 550 nm, and Rb is a reflectance at a wavelength of 550 nm.

2. The optical system according to claim 1, wherein the plurality of depressions or protrusions is formed on each of at least three optical surfaces on the light incidence side of the optical element formed of resin.

3. The optical system according to claim 1, wherein the optical element formed of resin is at least one of a plastic mold lens, an adhesive layer of a cemented lens, a color filter, and a polarizer.

4. The optical system according to claim 1, wherein the resin is a material having a bond between a carbon atom and a sulfur atom.

5. An image pickup apparatus comprising:

a photographing optical system; and an image pickup element that detects an image formed by the optical system, wherein the photographing optical system comprises:

a plurality of lenses in an optical path, each lens having optical surfaces;

an optical element formed of resin in the optical path; and a plurality of depressions or protrusions of a size not larger than wavelengths of visible light, and without having a periodic structure or being in a random arrangement, formed on at least two optical surfaces of the plurality of lenses which are located on a light incidence side of the optical element, the plurality of depressions or protrusions configured to scatter ultraviolet light and prevent reflection of visible light, wherein the following conditional expression is satisfied: $0<A2/D12<2.0$, in which A2 is an effective diameter of one of two optical surfaces closest to the optical element, and D12 is a distance between the two optical surfaces, wherein the plurality of depressions or protrusions satisfies the following conditional expressions:

$Sa > 1\%$, $Sb < 1\%$ and $Rb < 5\%$ wherein Sa is a scattering rate at a wavelength of 360 nm, Sb is a scattering rate at a wavelength of 550 nm, and Rb is a reflectance at a wavelength of 550 nm.

* * * * *